Figure 1:
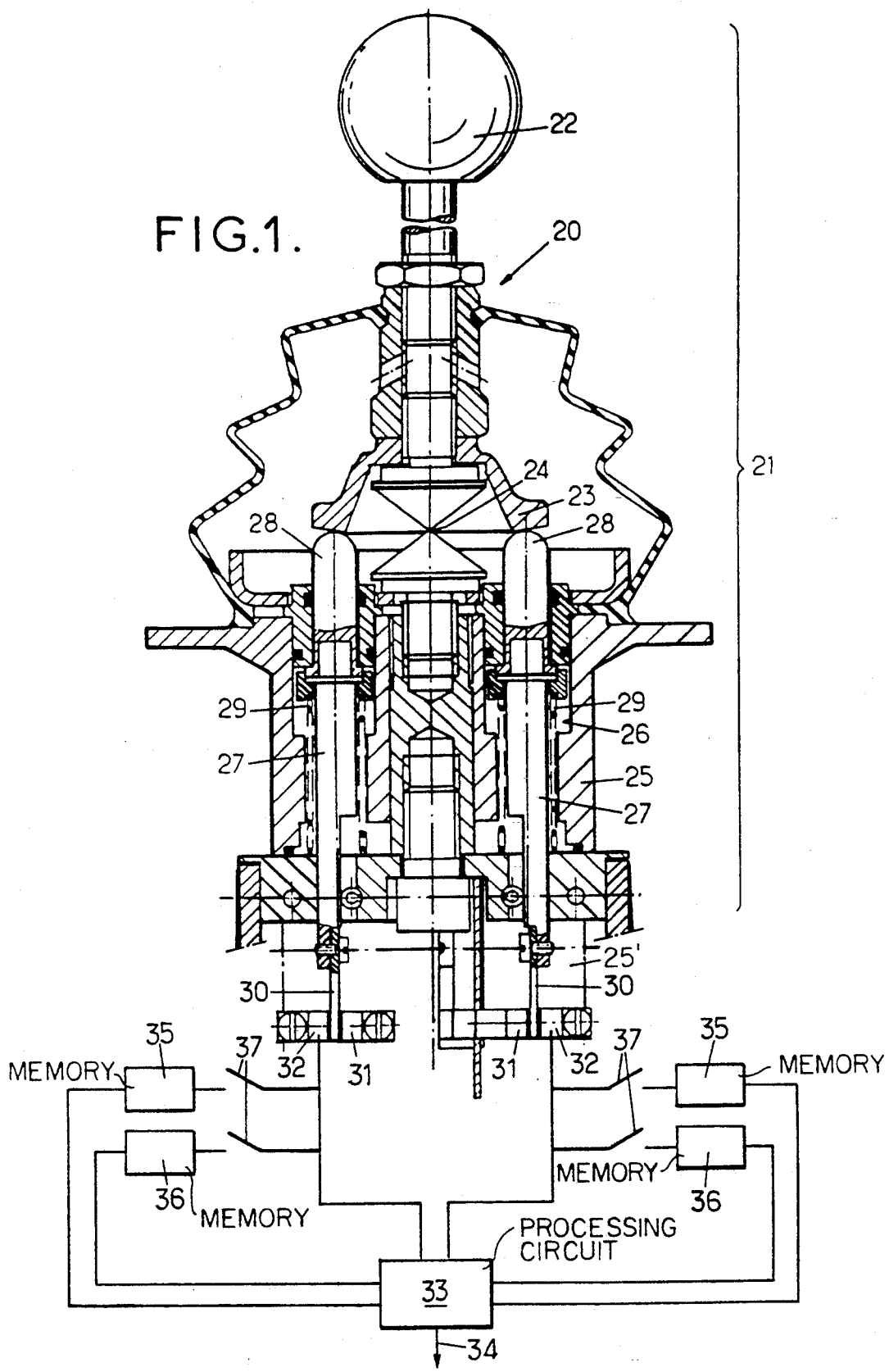

United States Patent [19]

Laroze et al.

[11] Patent Number: 5,164,722

[45] Date of Patent: Nov. 17, 1992

[54] METHOD OF CALIBRATING AN ELECTRIC REMOTE CONTROL DEVICE OF THE MANIPULATOR TYPE, AND DEVICE ADAPTED FOR IMPLEMENTING THIS METHOD

[75] Inventors: Gérard Laroze, Mions; J. Pierre Rigat-Esselin, Tassin la Demi-Lune; Marc Menvielle, Toulouse, all of France

[73] Assignee: Rexroth-Sigma, France

[21] Appl. No.: 539,555

[22] Filed: Jun. 15, 1990

[30] Foreign Application Priority Data

Jun. 16, 1989 [FR] France ................. 89 08042

[51] Int. Cl.$^5$ ............................ H03K 17/94
[52] U.S. Cl. ............................ 341/20; 73/1 R; 324/601; 364/571.01
[58] Field of Search ............ 340/870.04, 870.28, 340/870.29, 870.43, 709; 73/1 R, 1 J; 324/601; 250/221, 211 K, 231.1, 231.13; 364/571.01, 571.04; 341/20

[56] References Cited

U.S. PATENT DOCUMENTS

| | | | |
|---|---|---|---|
| 3,171,034 | 2/1965 | Tomasulo et al. | 250/211 K |
| 3,764,983 | 10/1973 | Stok | 340/870.04 |
| 4,284,885 | 8/1981 | Swensen | 250/211 K |
| 4,445,541 | 5/1984 | Schmiel | 250/221 X |
| 4,669,052 | 5/1987 | Bianco | 364/571.04 |
| 4,931,967 | 6/1990 | Boe et al. | 364/571.01 |

Primary Examiner—Donald J. Yusko
Assistant Examiner—Michael Horabik
Attorney, Agent, or Firm—Larson & Taylor

[57] ABSTRACT

An electric remote control device (20) includes sliding pushers (27) associated two by two and actuated from an actuating member. Each pusher is associated with a converter for generating an electric signal, a parameter of which is representative of the movement and/or position of the pusher and a signal processor (33) processes the signal produced at the output of the converter. The device provides for storing a defining equation between the position of the actuating member and the parameter of the output signal and the device includes a first storage unit (35) for storing the value of the parameter of the output signal of the converter when the actuating member is in a neutral position, corresponding to zero movement of the pusher, and a second storage (36) unit for storing the value of the parameter of the output signal of the converter when the actuating member is in an endmost position corresponding to maximum movement of the pusher.

13 Claims, 2 Drawing Sheets

METHOD OF CALIBRATING AN ELECTRIC REMOTE CONTROL DEVICE OF THE MANIPULATOR TYPE, AND DEVICE ADAPTED FOR IMPLEMENTING THIS METHOD

The present invention relates to improvements to electric remote control devices of the manipulator type or similar, comprising sliding pushers associated two by two, these pushers being actuated from an actuating member, particularly manual, and each pusher being associated with converter means adapted for generating an electric signal, a parameter of which is representative of the movement and/or position of said pusher, signal processing means for processing the electric signal collected at the output of said converter means, a law of proportionality being established between the position of the actuating member and the parameter considered of said output signal; the invention relates more precisely to a method for calibrating such devices as well as an arrangement of such devices which use said method for calibrating them.

The object of the invention is essentially to permit calibration of the device not only during manufacture to overcome the problems raised by the dispersion of the gains of the photo-couplers forming the receivers and by the piling up of positioning dimensions between the photo components (transmitter, receiver) and the mobile element, but also subsequently for compensating for the drift in time of certain parameters (for example modification of the transparency of the mobile element); the invention has then also as object to provide a method as well as an arrangement of the devices in question allowing overall adjustment of the device in a particularly simple, rapid and efficient way, while requiring only a minimum of components assigned specifically to this purpose.

For this, according to a first of its aspects, the invention provides a method for calibrating a remote control device of the above type which is characterized in that:

the actuating member is placed in a neutral position, corresponding to zero movement of said pusher, the corresponding value of the parameter considered of said electric signal is detected at the output of the converter means, this first value of the parameter of said electric signal is stored, the actuating member is placed in an endmost position corresponding to maximum movement of the pusher, the corresponding value of the parameter considered of said electric signal is detected at the output of the converter means, this second value of the parameter of said electric signal is stored, these steps being carried out successively for each pusher.

The invention thus uses the fact that all the individual causes of errors and/or of drift are cumulated in an overall result consisting in the drift of the value of the electric signal of each receiver; it is then sufficient, in accordance with the invention, to store these values of this electric signal for the two endmost values of the controlled function, corresponding to the two endmost values of the actuating member (0% control and 100% control respectively), which correspond in their turn respectively to the two end transparency values of the mobile element, namely total transparency and maximum opacity.

Such storage of the minimum and maximum values of operation is therefore easy and rapid to carry out for each pusher of the device, both during manufacture of the remote control device and during its life at the time of maintenance work (refreshing of the memories). As for use of the values thus stored, the electronic techniques used at the present time, and in particular recourse to microprocessors, make it particularly simple and efficient, whatever the number of pushers and the values thus stored.

Very simply, the detected parameter of the output electric signal of the converter means is the amplitude of said signal.

Advantageously, the output of the converter means is an electric voltage signal.

In a second of its aspects, the invention provides a specific arrangement of a device of the above type which is characterized in that it comprises, for each of the pushers which it comprises:

first storage means for storing the value of the parameter considered of the output signal of the converter means when the actuating member is in a neutral position, corresponding to zero movement of the pusher, and second storage means for storing the value of the parameter considered of the output signal of the converter means when the actuating member is in an endmost position corresponding to maximum movement of the pusher.

Advantageously, the output signal of the converter means is an electric voltage signal, the parameter considered of said signal being preferably its amplitude.

In short, by double data acquisition, the invention makes it possible to take into account all the fluctuating parameters playing a role in the operation of the device, without the need to carry out a compensatory adjustment on each of these parameters.

Figure 2:
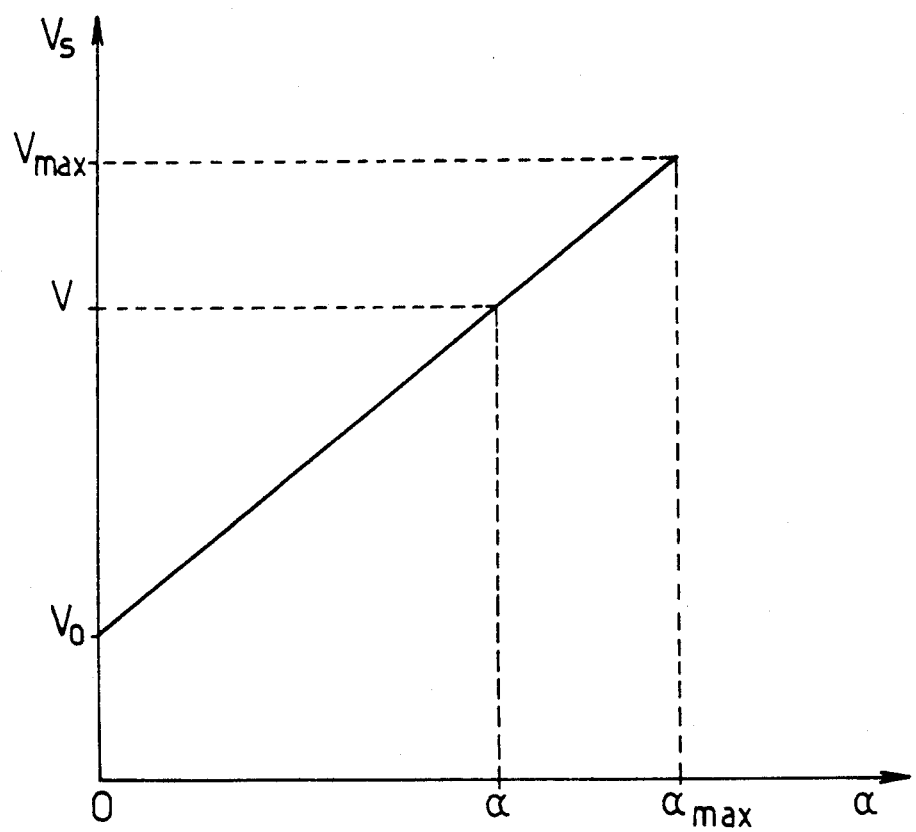

The invention will be better understood from the following detailed description of a preferred embodiment, given solely by way of non limitative example; in this description reference is made to the accompanying drawings in which:

FIG. 1 is a schematic view of a remote control device adapted in accordance with the invention, the manipulator being shown in section; and FIG. 2 is a graph illustrating the operating mode of the device adapted in accordance with the invention.

FIG. 1 shows an electric remote control device of the manipulator type, designated generally by the reference 20, comprising a manual actuating block 21 (upper part of the device 20 in FIG. 1) which is adapted conventionally, in a way known per se, for example for hydraulic manipulators controlling hydraulic slide valves. Briefly, an actuating handle 22, fast with a cam 23, is mounted for pivoting about an axis (in the case of a control of one or two circuits) or about a rocking point 24 in the case of the control of more than two circuits (three or four for example)—which is the case shown in the figure. The body 25 which supports handle 22 via its articulation 24 comprises bores 26 with parallel axes, particularly symmetrical with respect to the axis of body 25, and in which are disposed sliding rods or pushers 27 ending, at their upper part (in the figure), in fingers 28 projecting from body 25. Compression springs 29 associated with rods 27 push them permanently upwards so that one of the fingers 28 bears against the cam 23 when the latter is inclined to its side by actuation (leftwards or rightward for example, in FIG. 1) of handle 22.

At the lower part of body 25 is provided an enclosure or chamber 25' in which project the lower ends of rods 27. With each rod 27 is associated a position detection device formed in the following way. At the lower end of rod 27 is rigidly coupled a plate 30 of appropriate type with variable transparency adapted for sliding between an infrared radiation transmitter 31 and a receiver 32 disposed facing each other on each side of plate 30 and supported by any appropriate mechanical means (mounted on a printed circuit board, for example) adapted to ensure stability of the system. In FIG. 1, for the sake of clarity, all the electric connections of the transmitter and of the receiver with the electric circuits associated therewith have not been shown, and only the parts of the electronics required for understanding the invention have been shown.

Actuation of handle 22 causes a corresponding movement of one of rods 27, and so of plate 30 which is associated therewith, and the corresponding receiver 32 delivers an electric signal one parameter of which (for example the amplitude) varies in an equivalent way.

The remote control device 20 forms then a proportional control which delivers an electric signal representative of a mechanical movement, which electric signal may be transmitted to a distance, either by wires or by radiation, towards a controlled apparatus. Such an electric remote control device is particularly advantageous for it may be formed economically from inexpensive electronic components (infrared radiation transmitter and receiver), a proportionality member (plate 30) readily manufactured on a large scale at a low cost, by photographic processing of a film, and a manipulator 20 which is already existing in hydraulic controls for hydraulic valves.

For some applications at least, it is desirable, in the neutral or zero position of the device for it to be the zone of the mobile plate 30 having the greatest opacity which is interposed between transmitter 31 and receiver 32. The electric signal delivered by the receiver has then its minimum value (which may possibly be zero) and the influence of a thermal drift which might affect it is reduced thereby.

Furthermore, when the minimum transparency present at one end of the mobile plate 30 is totally opaque, it is difficult, even impossible, to ensure good progressiveness of opacity variation between this totally opaque zone and the beginning of the variable transparency zone; this non progressive transition risks causing a jolt in the control of the associated member (a crane arm for example) which may be prejudicial and/or dangerous. In such a case, it is then desirable for the opacity of the end zone of plate 30 to be not total. Thus, plate 30 has a grey graduation and receiver 32 receives an optical signal, of a more or less high amplitude, which results in the permanent delivery of an electric output signal whatever the position of plate 30 and so whatever the position of the actuating member between its neutral position (0% control) and its position of maximum movement (100% control).

It is necessary, during mounting, to overcome the problems raised by the dispersion of the gains of the photocouplers and by the piling up of the mutual positioning dimensions of the photocouplers and of the plates 30; it also necessary to compensate, during the life of the device, for the drift of certain parameters (for example obscuring of plates 30 and modification of its transparency due to deposits of dust and others and due to ageing).

To overcome these drawbacks, recourse is had to the following arrangements.

The output of each receiver 32, which is connected to a signal processing circuit may be advantageously formed by and/or include a microprocessor 33 delivering the signal controlling the controlled member (line 34 in FIG. 1), is also connected to two memories 35 and 36 via loading circuits shown schematically by switches 37 respectively. All the memories 35 and 36 are themselves connected to the processing circuit 33 which thus permanently has all the data stored in memory for all the plates 30 present in the device.

The actuating member 22 being in a neutral position $\alpha=0$ (0% control)—case shown in FIG. 1—the portion of each plate 30 situated between the corresponding transmitter 31 and receiver 32 has a certain grey value resulting in a given value of a parameter (voltage, current, frequency, phase, . . . ) of the output signal of receiver 32; in the case of the above mentioned preferred mounting, it is a question of the maximum grey value, corresponding to a minimum value $V_o$ (see FIG. 2) of the voltage of the output signal of receiver 32. By closing the single corresponding switch 37, this value of the signal is fed to the input of memory 35 which stores it as "reference value for 0% actuation"; then switch 37 is reopened.

Similarly, the actuating member 22 is then brought to a maximum movement position $\alpha$ max (100% control). The portion of plate 30, concerned by such actuation, which is interposed between the corresponding transmitter 31 and receiver 32 has another grey value—for example a minimum grey value, possibly total transparency—resulting in the maximum value $V_{max}$ of the voltage of the output signal of the receiver. By closing the second switch 37, this value of the signal is fed to the input of memory 36 which stores it as "reference value for 100% actuation" of the associated pusher; then switch 37 is re-opened. This operation is then repeated successively for all the pushers equipping the device, following which the processing circuit 33 has available all the 0% and 100% actuation reference values for all the pushers.

A biunique relation $V=f(\alpha)$ being established between voltage V (in the case considered) of the signal present at the output 34 of circuit 33 and the angle of inclination $\alpha$ of lever 22 for each of the pushers 27 (for example a linear relation as shown in FIG. 2), to each angular movement $\alpha$ of lever 22 there corresponds a value of the voltage V between $V_{min}$ and $V_{max}$.

Because all the causes of errors mentioned above result in short in a movement of plates 30 with respect to a reference position for which an additional adjustment was made, it will be understood that it is easy to carry out a new adjustment ("refreshment" of the 0% and 100% values) when that becomes necessary, for example during maintenance and overhaul work. The advantage conferred by this arrangement is that errors due to diverse causes independent of each other are compensated for as a whole by the storage—easy and rapid—of two data. In other words, the advantage of the device thus designed resides in the fact that it does not have fixed imposed references, which would result in complex, long and costly adjustments at the level of each of the members introducing such errors, but that it possesses "variable" references of which the respective effective values are easy to take into account whenever necessary.

As is evident and as it follows moreover from what has gone before, the invention is in no ways limited to those of its modes of application and embodiments which have been more especially considered; it embraces, on the contrary, all variants thereof.

We claim:

1. Method for calibrating an electric remote control device of the manipulator type comprising sliding pushers associated two by two, said pushers being actuated by an actuating member and each pusher being associated with converter means for generating at the output thereof an electric signal a parameter of which is representative of the movement and/or position of said pusher, and signal processing means for processing the electric signal generated at the output of said converter means, and wherein a correspondence is established between the position of the actuating member and said parameter of said electric signal, said method comprising the steps of:

placing the actuating member in a neutral position corresponding to zero movement of said pusher, detecting the corresponding value of said parameter of said electric signal at the output of the converter means, storing said corresponding value of the parameter of said electric signal for said neutral position, placing the actuating member in an endmost position corresponding to maximum movement of the pusher, detecting the corresponding value of said parameter of said electric signal at the output of the converter means for said endmost position, and storing and corresponding value of the parameter of said electric signal for said endmost position, and carrying out the foregoing steps successively for each pusher.

2. Method according to claim 1, wherein the detected parameter of the electric signal of the converter means is the amplitude of said signal.

3. Method according to claim 1, wherein the electric signal is an electric voltage signal.

4. Electric remote control device of the manipulator type comprising sliding pushers associated two by two, these pushers being actuated by an actuating member, and each pusher being associated with converter means for generating at the output thereof an electric signal a parameter of which is representative of the movement and/or position of said pusher, and said device further comprising signal processing means for processing the electric signal generated at the output of said converter means, and means for storing a defining relationship between the position of the actuating member and the corresponding value, said parameter of said electric signal, said device further comprising:

first storage means for storing the value of the parameter of the electric signal generated by the converter means when the actuating means is in a neutral position corresponding to zero movement of the pusher, and second storage means for storing the value of the parameter of the electric signal generated by the converter means when the actuating member is in an endmost position corresponding to maximum movement of the pusher.

5. Electric remote control device according to claim 4, wherein the electric signal generated by the converter means is an electric voltage signal.

6. Electric remote control device according to claim 4, wherein the parameter of the electric signal generated by the converter means is the amplitude of said electric signal.

7. Electric remote control device according to claim 4, wherein the first and second storage means comprise non volatile memories.

8. Electric remote control device according to claim 4, wherein the converter means comprises a mobile element affixed to the pusher and having a transparency varying between a maximum mean value towards one of the ends thereof and a minimum means value towards the opposite end thereof, and a radiation transmitter and a receiver which are disposed so as to face each other and between which the mobile element is disposed so that the mobile element modifies correspondingly the magnitude of radiation received by the receiver from said transmitter.

9. Electric remote control device according to claim 8, wherein the end of the mobile element having the transparency of maximum mean value is situated between the transmitter and the receiver when the actuating member is in the neutral position.

10. Electric remote control device according to claim 4, wherein said device further comprises a body with parallel bores in which said pushers, which are disposed particularly symmetrically with respect to the axis of the body, are mounted for sliding, said pushers being actuated by an oscillating cam affixed to said actuating member and being pushed into abutment against said cam by respective resilient means.

11. Electric remote storage device according to claim 4, wherein said signal processing means comprises microprocessor means for generating, based on said defining relationship and said stored values and in response to a value of said parameter between said stored values produced by movement of said actuating member to a position between said neutral position and said endmost position, a control signal for controlling the amount of movement of a controlled member.

12. Electric remote storage device according to claim 4, further comprising switching means for, upon actuation thereof when said actuating member is in the neutral position, transferring an updated value of said parameter generated by said converter means for said neutral position to said first storage means and for, upon actuation thereof when said actuating member is in said endmost position, transferring an updated value of said parameter generated by said converter means for said endmost position to said storage means.

13. Electric remote storage device according to claim 12, wherein said signal processing means comprises microprocessor means for generating, based on said defining relationship and said updated values and in response to a value of said parameter between said stored values produced by movement of said actuating member to a position between said neutral position and said endmost position, a control signal for controlling the amount of movement of a controlled member.

* * * * *